(12) United States Patent
Uchikawa et al.

(10) Patent No.: US 8,324,127 B2
(45) Date of Patent: Dec. 4, 2012

(54) METHOD OF PRODUCING NOBLE METAL-SUPPORTED POWDER, NOBLE METAL-SUPPORTED POWDER AND EXHAUST GAS PURIFYING CATALYST

(75) Inventors: Fumihiro Uchikawa, Yokohama (JP); Yoshiaki Hiramoto, Yokosuka (JP); Haruhiko Shibayama, Yokohama (JP); Keita Manyu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 54 days.

(21) Appl. No.: 12/740,445

(22) PCT Filed: Nov. 7, 2008

(86) PCT No.: PCT/JP2008/070336
§ 371 (c)(1),
(2), (4) Date: Apr. 29, 2010

(87) PCT Pub. No.: WO2009/060950
PCT Pub. Date: May 14, 2009

(65) Prior Publication Data
US 2010/0261602 A1    Oct. 14, 2010

(30) Foreign Application Priority Data

Nov. 8, 2007   (JP) ................. 2007-290743
Nov. 4, 2008   (JP) ................. 2008-283480

(51) Int. Cl.
B01J 23/00   (2006.01)
B01J 21/00   (2006.01)

(52) U.S. Cl. ............ 502/326; 502/5; 502/304; 502/327; 502/332; 502/333; 502/334; 502/339; 502/355; 502/415; 502/439

(58) Field of Classification Search ............ 502/5, 304, 502/326, 327, 332, 333, 334, 339, 355, 415, 502/439
See application file for complete search history.

(56) References Cited

U.S. PATENT DOCUMENTS

| | | | |
|---|---|---|---|
| 4,587,226 A * | 5/1986 | Sasaki et al. | 502/5 |
| 6,251,820 B1 * | 6/2001 | Tsuji | 502/242 |
| 6,440,378 B1 * | 8/2002 | Hirata et al. | 423/239.1 |
| 6,548,440 B1 * | 4/2003 | Pham et al. | 502/71 |
| 6,660,680 B1 * | 12/2003 | Hampden-Smith et al. | 502/180 |
| 6,911,412 B2 * | 6/2005 | Hampden-Smith et al. | 502/180 |
| 7,138,354 B2 * | 11/2006 | Hampden-Smith et al. | 502/101 |
| 7,700,520 B2 * | 4/2010 | Chien et al. | 502/334 |
| 7,722,687 B2 * | 5/2010 | Hampden-Smith et al. | 29/623.5 |
| 7,833,925 B2 * | 11/2010 | Min et al. | 502/5 |

(Continued)

FOREIGN PATENT DOCUMENTS
CN    1819872 A    8/2006
(Continued)

Primary Examiner — Cam N. Nguyen
(74) Attorney, Agent, or Firm — Foley & Lardner LLP

(57) ABSTRACT

In the present invention, slurry is formed by mixing noble metal-supported powder particles (3) and a binder (4) with each other in a liquid (Step S1), and the noble metal-supported powder particles (3) are dispersed by applying vibrations to the slurry (Step S2), and thereafter, the slurry is spray dried while keeping a state where the noble metal-supported powder particles (3) are dispersed (Step S3), whereby noble metal-supported powder (1) is produced. In the noble metal-supported powder (1) produced by such a method, pores through which exhaust gas flows are formed appropriately, and accordingly, exhaust gas purification performance can be enhanced.

4 Claims, 7 Drawing Sheets

U.S. PATENT DOCUMENTS

| | | | |
|---|---|---|---|
| 7,838,457 B2 * | 11/2010 | Katori et al. | 502/101 |
| 7,863,215 B2 * | 1/2011 | Miyazoe et al. | 502/232 |
| 7,879,748 B2 * | 2/2011 | Marti et al. | 502/5 |
| 2002/0107140 A1 * | 8/2002 | Hampden-Smith et al. | 502/185 |
| 2003/0036476 A1 * | 2/2003 | Arnold et al. | 502/325 |
| 2004/0072683 A1 * | 4/2004 | Kodas et al. | 502/224 |
| 2006/0183942 A1 * | 8/2006 | Gaffney et al. | 562/547 |
| 2007/0160899 A1 * | 7/2007 | Atanassova et al. | 429/44 |

FOREIGN PATENT DOCUMENTS

| | | |
|---|---|---|
| JP | 01-148342 A | 6/1989 |
| JP | 2000-126603 A | 5/2000 |
| JP | 2000-262906 A | 9/2000 |
| JP | 2002-191988 A | 7/2002 |
| JP | 2004-331444 A | 11/2004 |
| WO | WO 2004/110622 A1 | 12/2004 |

* cited by examiner

MEAN PARTICLE DIAMETER
1~20 μm

US 8,324,127 B2

METHOD OF PRODUCING NOBLE METAL-SUPPORTED POWDER, NOBLE METAL-SUPPORTED POWDER AND EXHAUST GAS PURIFYING CATALYST

TECHNICAL FIELD

The present invention relates to a method of producing noble metal-supported powder, the noble metal-supported powder and an exhaust gas purifying catalyst.

BACKGROUND ART

An exhaust gas purifying catalyst has been being widely used in order to remove harmful substances such as a hydrocarbon (HC)-based compound, carbon monoxide (CO) and nitrogen oxide ($NO_x$), which are contained in exhaust gas discharged from an internal combustion engine.

The exhaust gas purifying catalyst is a catalyst composed of one catalyst layer or by stacking two or more catalyst layers on one another. Each of the catalyst layers is formed in such a manner that powder in which particles of noble metal such as platinum (Pt) are supported on a support containing, as a main component, a porous inorganic material such as alumina ($Al_2O_3$) is coated on an inner wall surface of a refractory inorganic substrate made of ceramics or metal foil. The refractory inorganic substrate has various shapes as well as a monolithic shape. Such noble metal-supported powder coated on the refractory inorganic substrate is particles with a mean particle diameter approximately ranging from 1 [μm] to 20 [μm]. Independently of gas diffusibility, the noble metal-supported powder dispersively supports, on a surface thereof and in an inside thereof, the noble metal serving as an activity center to purify a harmful gas component in the exhaust gas.

With regard to the exhaust gas purifying catalyst as described above, there is one in which, in a coating layer (catalyst layer), pores with a pore diameter of 0.1 to 20 [μm] occupy 60% or more of the entire pore volume, and pores with a pore diameter of 10 to 20 [μm] occupy 20% or more of the entire pore volume (Patent Citation 1).

Patent Citation 1: Japanese Patent Unexamined Publication No. 2002-191988

DISCLOSURE OF INVENTION

The powder that supports the noble metal thereon is composed of primary particles in which particles of the noble metal are supported on porous inorganic powder particles, or of secondary particles formed by aggregating the primary particles, and has a mean particle diameter approximately ranging from 1 to 20 [μm]. In such noble metal-supported powder, the noble metal particles which have a function to purify the exhaust gas are present in the inside of the noble metal-supported powder and on the surface thereof. In the inside of the noble metal-supported powder, the pores effective in diffusion of the gas are extremely few, and accordingly, it is difficult for the exhaust gas to reach the noble metal in the inside of the noble metal-supported powder through the pores. Hence, among the noble metal present in the noble metal-supported powder, the noble metal in the inside of the powder has not received the harmful gas component efficiently, and has not functioned effectively to purify the exhaust gas.

If it is possible to form the pores effective in the gas diffusion in the inside of the noble metal-supported powder, then the noble metal in the inside of the powder is enabled to function effectively to purify the exhaust gas. However, heretofore, there has been no method of forming the pores effective in the gas diffusion in the inside of the noble metal-supported powder.

Further, if a compound support that supports the noble metal thereon is mixed as particles with a mean particle diameter of 1 [μm] or less into slurry containing a binder, then powder of the compound support is reaggregated. Accordingly, it has been difficult to fix pieces of the support in a state of spacing the pieces apart from one another.

In order to solve the above-described problems, a method of producing noble metal-supported powder, which is an aspect of the present invention, is summarized to include: preparing a slurry by mixing noble metal-supported powder particles and a binder with each other in a liquid; and dispersing the noble metal-supported powder particles by applying vibrations to the slurry, and thereafter, spray drying the slurry while keeping a state where the noble metal-supported powder particles are dispersed.

Moreover, a noble metal-supported powder that is another aspect of the present invention is summarized to include: a plurality of noble metal-supported powder particles; and a binder, wherein a mean particle diameter of the plurality of noble metal-supported powder particles is 1 [μm] or less.

Furthermore, an exhaust gas purifying catalyst that is another aspect of the present invention is summarized to include: at least one catalyst layer formed on a refractory inorganic substrate by coating thereon a slurry containing the noble metal-supported powder produced by the above-described method according to the present invention.

Still further, an exhaust gas purifying catalyst that is another aspect of the present invention is summarized to include: at least one catalyst layer on a refractory inorganic substrate, wherein the above-described noble metal-supported powder according to the present invention is contained in the catalyst layer.

BEST MODE FOR CARRYING OUT THE INVENTION

A description will be made below of a method of producing noble metal-supported powder, the noble metal-supported powder and an exhaust gas purifying catalyst, which are according to the present invention.

Figure 1:
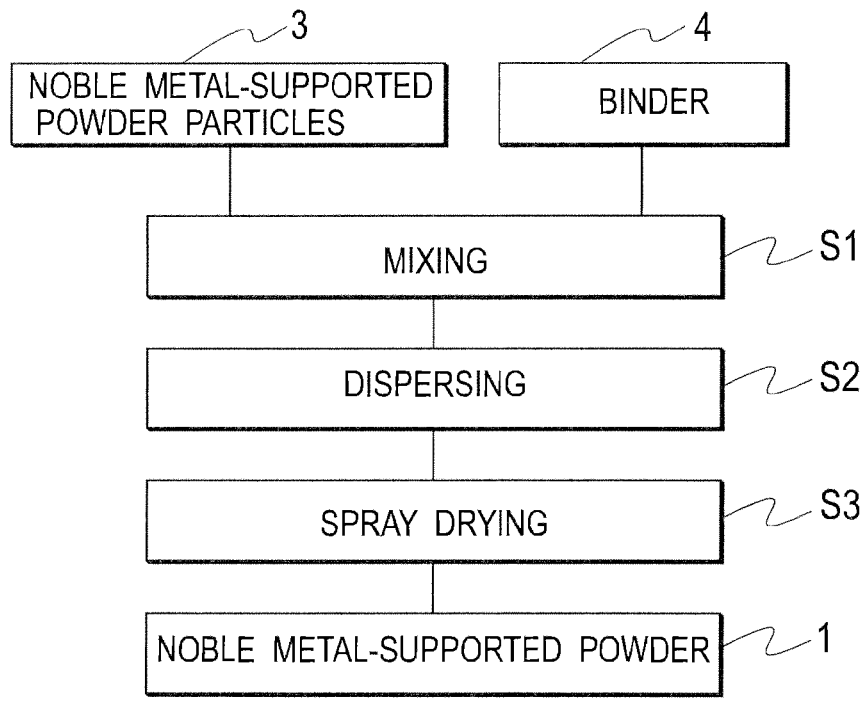
FIG. 1 is a flowchart explaining an example of a method of producing noble metal-supported powder according to the present invention.

FIG. 1 is a flowchart explaining an example of the method of producing noble metal-supported powder according to the present invention. As shown in FIG. 1, in order to produce noble metal-supported powder 1 by the method of producing noble metal-supported powder according to the embodiment of the present invention, first, noble metal-supported powder particles 3 and a binder 4 are prepared. As noble metal, there can be used one type or two or more types of noble metals such as platinum (Pt), rhodium (Rh) and palladium (Pd), which have a catalytic function to purify exhaust gas. Moreover, also as a support that supports such noble metal thereon, one type or two or more types of porous inorganic materials such as alumina can be used. Furthermore, a method for supporting the noble metal on the support is not particularly limited, either, and for example, an impregnation method and the like can be used.

As the binder, for example, the one containing alumina as a main component can be used.

Next, the noble metal-supported powder particles 3 and the binder 4 are mixed with each other in a liquid, whereby slurry is formed (Step S1). While at least one type of the noble metal-supported powder particles 3 is necessary, two or more types of the noble metal-supported powder particles 3 different in noble metal and/or noble metal-supported powder may be provided. Note that, in this slurry, there may be contained oxide of at least one type of metal selected from Mn, Fe, Co, Ni, Y, Ba, Zr, La, Ce, Pr and Nd besides the noble metal-supported powder particles 3 and the binder 4.

Subsequently, vibrations are applied to the slurry, and the noble metal-supported powder particles 3 in the slurry are dispersed (Step S2). Next, while keeping a state where the noble metal-supported powder particles 3 are dispersed in the slurry, the slurry was spray dried (Step S3). In such a way, the noble metal-supported powder 1 including the noble metal-supported powder particles 3 and the binder 4 is produced.

In accordance with the method of producing the noble metal-supported powder according to the embodiment of the present invention, the slurry is spray dried (Step S3), and is thereby dried quickly, whereby pores effective in gas diffusion can be formed in an inside of the noble metal-supported powder 1. By the formation of the pores, the noble metal in the inside of the powder can also be used effectively to purify the exhaust gas, and accordingly, an exhaust gas purifying catalyst in which purification performance is enhanced can be produced.

Moreover, such high dispersion treatment (Step S2) is performed immediately before the slurry is dried quickly by being spray dried (Step S3), whereby the noble metal-supported powder particles 3 can be fixed in a state of being spaced apart from one another. Therefore, an exhaust gas purifying catalyst in which catalyst performance is less deteriorated even in use at a high temperature for a long time can be produced.

Figure 2:
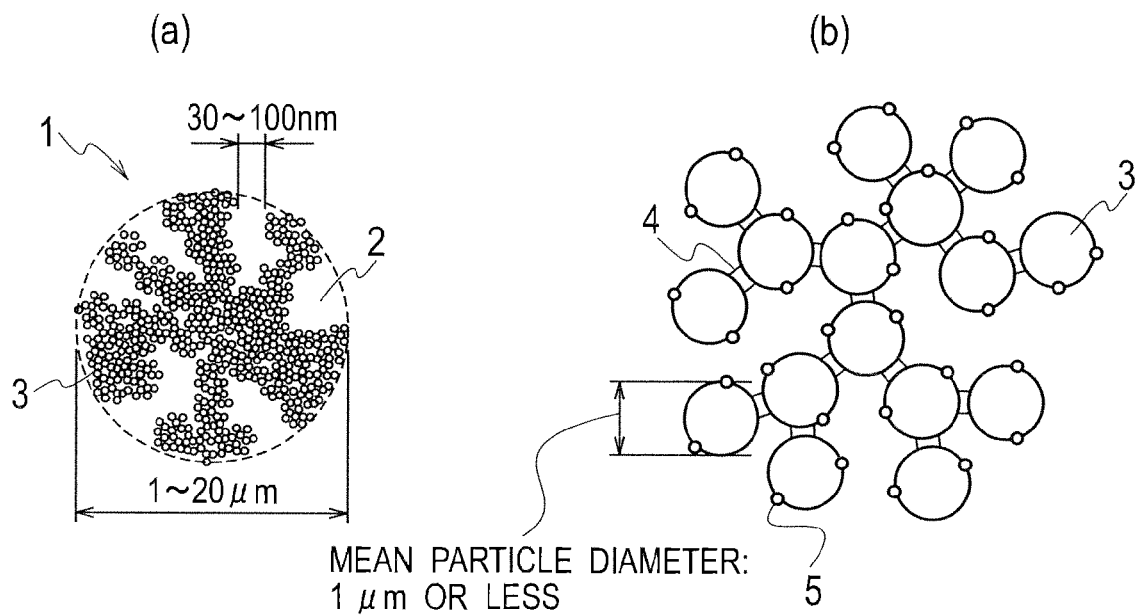
FIG. 2 is a schematic view of noble metal-supported powder according to an embodiment of the present invention.

Then, the high dispersion treatment and quick dry of the slurry, which are mentioned above, are combined with each other, whereby noble metal-supported powder according to the embodiment of the present invention, which is as shown in FIG. 2, can be obtained.

FIG. 2 is a schematic view of an example of the noble metal-supported powder according to the present invention. FIG. 2A shows one piece of the noble metal-supported powder, and this noble metal-supported powder 1 is a particle with a diameter approximately ranging from 1 to 20 [μm]. In the noble metal-supported powder 1, plural pores 2 which communicate with the inside thereof are formed. The pores 2 have a pore diameter, for example, approximately ranging from 30 to 100 [nm]. The noble metal-supported powder 1 is composed of secondary particles formed by aggregating the plural noble metal-supported powder particles 3 with a mean particle diameter of 1 [μm] or less. In other words, the noble metal-supported powder 1 has a structure in which the noble metal-supported powder particles 3 are aggregated so as to form the predetermined pores 2.

A schematic view in which the noble metal-supported powder 1 of FIG. 2A is partially enlarged is shown in FIG. 2B. The noble metal-supported powder particles 3 which compose the noble metal-supported powder 1 are fine particles with a mean particle diameter of 1 [μm] or less, and the noble metal-supported powder particles 3 are bonded to one another by the binder 4. Noble metal particles 5 are supported on each surface of the noble metal-supported powder particles 3. As illustrated, the fine noble metal-supported powder particles 3 are bonded to one another by the binder 4, whereby the noble metal-supported powder 1 is formed as the secondary particles, and the noble metal-supported powder 1 has the pores 2 with a pore diameter approximately ranging from 30 to 100 [nm], which communicate with the inside of the noble metal-supported powder 1.

In the method of producing the noble metal-supported powder according to the present invention, which is for producing the noble metal-supported powder as shown in FIG. 2, it is preferable to set degree of dispersion of the noble metal-supported powder particles in the slurry at 33% or more by applying the vibrations to the slurry. The degree of dispersion is calculated by the following Expression (1) from a measurement result of dispersion state of the slurry and from the mean particle diameter of the particles contained in the slurry. The measurement result of dispersion state and the mean particle diameter are obtained by using a grain size distribution measuring apparatus.

$$[\text{Degree of dispersion}](\%)=[\text{Mean particle diameter}]/[\text{Dispersion state measurement result}]\times 100 \quad (1)$$

Note that the dispersion state measurement result in Expression (1) is a mean particle diameter of the slurry immediately after being subjected to the high dispersion treatment, the slurry being obtained by mixing the noble metal-supported powder particles 3 and the binder 4 with each other, and the dispersion state measurement result is generally obtained as follows by a grain size distribution measuring apparatus of a dynamic light scattering mode.

An appropriate amount of the slurry is sampled, which is obtained by mixing the noble metal-supported powder particles 3 and the binder 4 with each other and is subjected to the high dispersion treatment by an ultrasonic dispersing device. Then, the slurry is filled into a transparence cell. When sizes of the particles in such a mixed state differ, the particles cause the Brownian movement at different speeds. Accordingly, when a laser beam is irradiated onto the particles from a side surface of the transparent cell, the particles emit scattering light corresponding to the sizes thereof. The mean particle diameter of the slurry is calculated from a frequency and intensity of the scattering light.

Such vibration application treatment that highly disperses the slurry in a state where the degree of dispersion is 33% or more is performed immediately before the quick dry of the slurry, whereby the noble metal-supported powder particles can be fixed in the state of being spaced apart from one another. Accordingly, movement and aggregation/particle growth of the noble metal among the noble metal-supported powder particles doe not occur. Therefore, an exhaust gas purifying catalyst can be produced, in which a surface area of the noble metal is less decreased, and eventually, the catalyst performance is less deteriorated.

Figure 3:
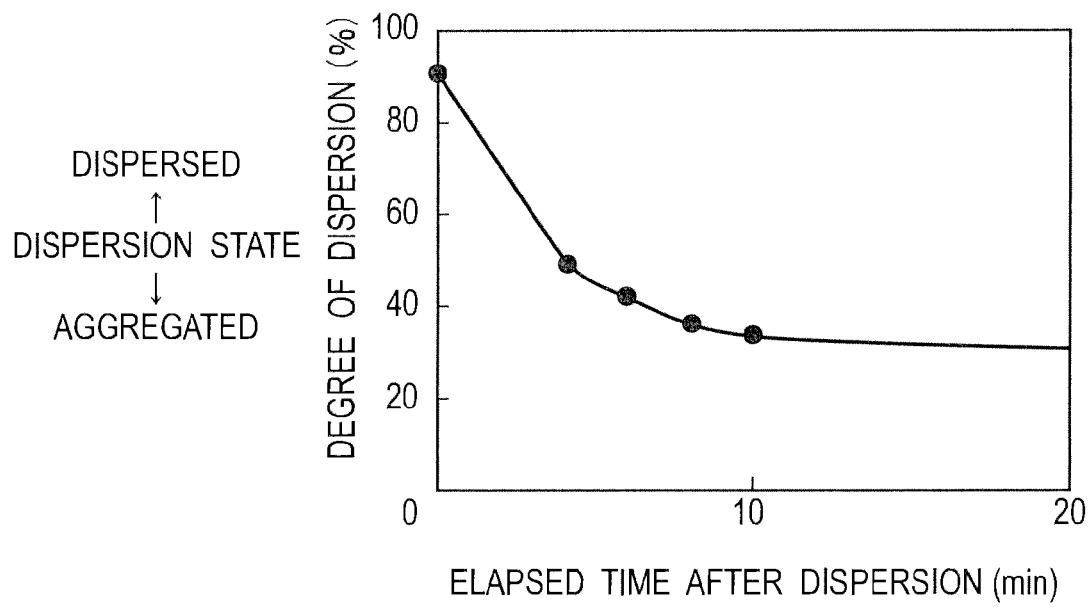
FIG. 3 is a graph showing a relationship between an elapsed time after dispersion of dispersed slurry and degree of dispersion of noble metal-supported powder particles.

FIG. 3 shows, by a graph, results of measuring a relationship between an elapsed time after the dispersion of the slurry obtained by dispersing the noble metal-supported powder particles in the liquid and the degree of dispersion of the noble metal-supported powder particles in the slurry. As shown in FIG. 3, as the time elapses from immediately after the dispersion, the degree of dispersion of the noble metal-supported powder particles is being reduced.

Then, the degree of dispersion immediately before the slurry is dried is set at the state particularly as high as 33% or more, whereby, in an ideal state, it becomes possible to maintain a structure of the noble metal-supported powder particles in the state where the noble metal-supported powder particles are spaced apart from one another, and to fix the noble metal-supported powder particles.

A slurry dispersing device can be used for the vibration application performed in order to turn the slurry into the highly dispersed state. Here, if a high-speed stirrer is used as the slurry dispersing device, then the dispersion treatment is performed in accordance with a batch treatment mode, and continuous treatment between the dispersion treatment and the quick dry cannot be performed, and accordingly, production efficiency in this case is low. As opposed to this, if the ultrasonic dispersing device is used as the slurry dispersing device, then it becomes possible to perform the continuous treatment between the high dispersion treatment and the quick dry, and accordingly, production efficiency in this case is higher than in the case of using the high-speed stirrer.

Hence, in order to apply the vibrations in the method of producing the noble metal-supported powder according to the present invention, it is particularly preferable to use the ultrasonic dispersing device.

It is preferable to perform the spray drying (Step S3) under a condition where moisture of liquid droplets with a diameter of 1 [mm] or less is evaporated within 1 second per piece of the liquid droplets. The slurry is turned to the liquid droplets with a diameter of 1 [mm] or less, and the moisture thereof is evaporated within 1 second per piece of the liquid droplets, whereby many pores effective in the gas diffusion can be formed. By the formation of the pores, the noble metal in the inside of the powder can also be used effectively to purify the exhaust gas, and accordingly, the exhaust gas purifying catalyst in which the purification performance is enhanced can be produced.

It is preferable to use, as the binder, the one containing inorganic oxide as a main component, in which a mean particle diameter is within a range from $1/10$ to 10 times that of the noble metal-supported powder particles, and to set a mixing ratio of the noble metal-supported powder particles and the binder within a range from 10:90 to 90:10. As the binder to be mixed with the noble metal-supported powder particles, there is used the binder containing the inorganic oxide as the main component, in which the mean particle diameter is within the range from $1/10$ to 10 times that of the noble metal-supported powder particles, then the mixing ratio of the noble metal-supported powder particles and the binder is set within the range from 10:90 to 90:10, and the slurry is subjected to the high dispersion treatment immediately before the quick dry thereof. In such a way, the noble metal-supported powder particles can be fixed in the state of being spaced apart from one another. Accordingly, the exhaust gas purifying catalyst in which the catalyst performance is less deteriorated even in use at a high temperature for a long time can be produced.

As materials of the binder, for example, there are alumina ($Al_2O_3$), silica ($SiO_2$), titania ($TiO_2$), zirconia ($ZrO_2$), and the like.

As mentioned above, in the slurry obtained by mixing the noble metal-supported powder particles and the binder with each other, there may be contained the oxide of at least one type of the metal selected from Mn, Fe, Co, Ni, Y, Ba, Zr, La, Ce, Pr and Nd. Among them, it is preferable to further add Ce-containing oxide powder particles. The Ce-containing oxide functions as a promoter, and has an oxygen storage/release capability. Hence, in the exhaust gas purifying catalyst produced of the noble metal-supported powder particles containing the Ce-containing oxide, the exhaust gas purification performance is enhanced. Note that, on this Ce-containing oxide powder, there may be supported: the oxide of at least one type of the metal selected from Mn, Fe, Co, Ni, Y, Ba, Zr, La, Pr and Nd; and/or at least one type of noble metal selected from Au, Pt, Ir, Os, Ag, Pd, Rh and Ru.

Next, a description will be made of the noble metal-supported powder according to the present invention. As already mentioned by using FIG. 2A, the noble metal-supported powder 1 has the pores 2 which communicate with the inside thereof, and accordingly, the exhaust gas to be purified can sufficiently reach the inside of the noble metal-supported powder 1. Hence, the exhaust gas is purified also by the noble metal particles 5 supported on the noble metal-supported powder particles 3 present in the inside of the noble metal-supported powder 1. Therefore, the exhaust gas purification performance is enhanced.

The noble metal-supported powder 1 according to the present invention can be produced by the above-mentioned method of producing the noble metal-supported powder according to the present invention.

In the noble metal-supported powder 1, it is preferable that the mean particle diameter of the noble metal-supported powder particles be 1 [μm] or less. By the fact that the mean particle diameter of the noble metal-supported powder particles is 1 [μm] or less, the pores effective in the gas diffusion can be ensured in the inside of the noble metal-supported powder. More preferably, the mean particle diameter of the noble metal-supported powder particles is 90 [nm] or more to 550 [nm] or less. In both of the case where the mean particle diameter of the noble metal-supported powder particles does not reach 90 [nm] and the case where the mean particle diameter exceeds 550 [nm], it is difficult to sufficiently ensure the pores effective in the gas diffusion. By setting the noble metal-supported powder particles at such a mean particle diameter of 90 [nm] or more to 550 [nm] or less, many pores effective in the gas diffusion can be formed in the inside of the noble metal-supported powder. By the formation of the pores, the noble metal in the inside of the powder can also be used effectively to purify the exhaust gas, and accordingly, the exhaust gas purifying catalyst in which the purification performance is enhanced can be produced.

A wet pulverizer using a pulverization medium can be used for finely granulating the noble metal-supported powder particles; however, a method of such fine granulation is not limited to a pulverization process.

It is preferable that the noble metal-supported powder 1 be the one, in which the binder contains the inorganic oxide as the main component, and the mean particle diameter is within the range from 1/10 to 10 times that of the noble metal-supported powder particles, and that the mixing ratio of the noble metal-supported powder particles and the binder be within the range from 10:90 to 90:10.

The noble metal-supported powder 1 according to the present invention can further contain the Ce-containing oxide powder particles. By the fact that the noble metal-supported powder 1 further includes the Ce-containing oxide powder particles, the purification characteristics of the exhaust gas purifying catalysts are enhanced.

Figure 4:
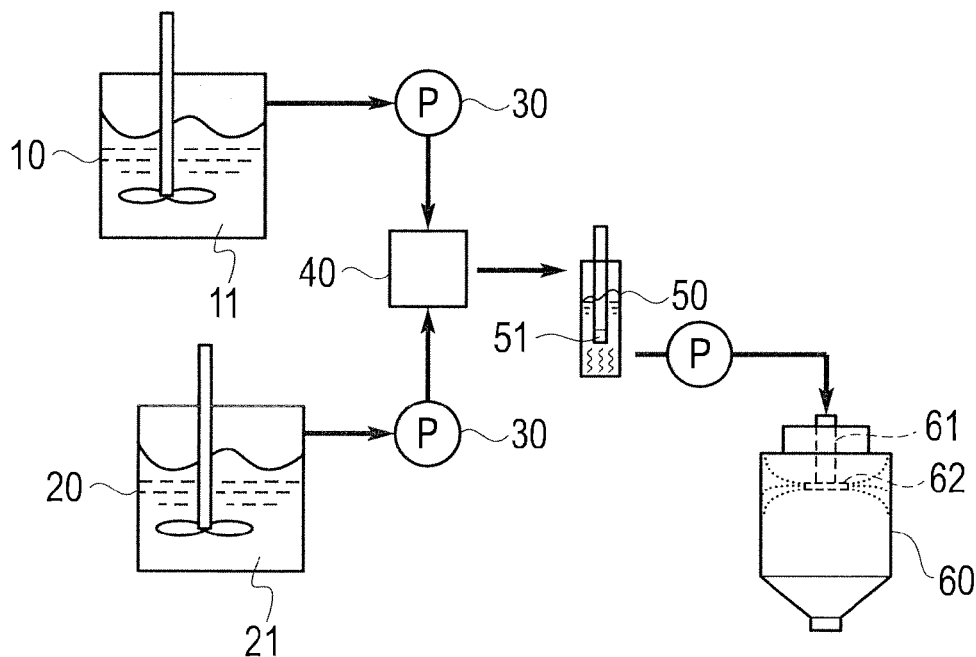
FIG. 4 is a schematic view of an example of a production apparatus for use in a method of producing the noble metal-supported powder according to this embodiment.

A schematic view of an example of a production apparatus for use in the method of producing the noble metal-supported powder according to the present invention is shown in FIG. 4. The production apparatus of the noble metal-supported powder includes: a slurry dispersing device 50 that applies the vibrations to the slurry and performs the high dispersion treatment therefor; and a rapid dryer 60 that spray dries the slurry highly dispersed by the slurry dispersing device 50.

In FIG. 4, slurry 11 of the noble metal-supported powder particles is housed in a container 10 for the noble metal-supported powder, and slurry 21 of the binder is housed in a container 20 for the binder. The noble metal-supported powder in such noble metal-supported powder particle slurry 11 is the one in which the mean particle diameter becomes 1 [μm] or less by being subjected to the step of supporting the noble metal thereon and the step of being finely granulated. Moreover, the binder in such binder slurry 21 is, as mentioned above, the one having the particle diameter corresponding to the particle diameter of the noble metal-supported powder particles in the noble metal-supported powder particle slurry 11. Such a noble metal-supported powder container 10 and such a binder container 20 individually include stirring means, and the stirring means suppress aggregation of the noble metal-supported powder particle slurry 11 and the binder slurry 21, each of which is housed in the container.

The noble metal-supported powder particle slurry 11 is supplied to a mixer 40 by a pump 30, the binder slurry 21 is also supplied to the mixer 40 by a pump 30 in a similar way, and the slurry obtained by mixing the noble metal-supported powder particles and the binder with each other is formed by the mixer 40. The mixing ratio of the noble metal-supported powder particle slurry 11 and the binder slurry 21 is adjusted so as to become the above-mentioned appropriate range.

The noble metal-supported powder particle slurry 11 and the binder slurry 21, which are mixed with each other by the mixer 40, are guided to the slurry dispersing device 50. The slurry dispersing device 50 is preferably the ultrasonic dispersing device shown as a slurry dispersing device 50 in FIG. 4. In the slurry dispersing device 50, the vibrations are applied to the slurry by an ultrasonic vibrator 51 immersed into the slurry, whereby the noble metal-supported powder particles and the binder in the slurries are uniformly dispersed. The degree of dispersion of the noble metal-supported powder particles in the slurry can be set at 33% or more by the ultrasonic dispersing device.

The slurry in the state of being sufficiently dispersed by the slurry dispersing device 50 is supplied to the rapid dryer 60 through a pump, and is dried by the rapid dryer 60 in a short time. The rapid dryer 60 is a device capable of turning the slurry into liquid droplets with a diameter of 1 [mm] or less, and evaporating moisture of the liquid droplets within 10 [second] per piece of the liquid droplets. Spray dryers are preferable as the rapid dryer 60. Among the spray dryers, a spray dryer shown as the rapid dryer 60 in FIG. 4 is a device that includes, in an upper portion of a dryer chamber thereof, an atomizer 61 ejecting the slurry guided thereto from the slurry dispersing device 50, and spray dries the slurry in such a manner that a rotary disc 62 on a tip end of the atomizer 61 rotates at a high speed to finely granulate and spray the slurry in a predetermined high-temperature atmosphere. The rotary disc atomizer is particularly easy to control the liquid droplet diameter and the temperature of the dryer chamber, and can obtain uniform powder, and accordingly, is suitable for producing the noble metal-supported powder according to the present invention. Note that the atomizer may be the one of a nozzle type, which can finely granulate and spray the slurry. The slurry is quickly dried by using the rapid dryer 60 as described above, whereby the noble metal-supported powder composed of the noble metal-supported powder particles and the binder can be formed.

Such a combination of the slurry dispersing device 50 as the ultrasonic dispersing device and the rapid dryer 60 as the spray dryer enables the continuous treatment between the dispersion treatment and the quick dry, and is a desirable combination for the production apparatus also from a viewpoint that high production efficiency can be obtained.

The slurry containing the noble metal-supported powder according to the present invention is coated on a refractory inorganic substrate, and at least one catalyst layer is formed, whereby the exhaust gas purifying catalyst according to the present invention is produced.

The exhaust gas purifying catalyst according to the present invention, which is as described above, is the one in which at least one catalyst layer is formed on the refractory inorganic substrate in such a manner that the slurry containing the noble metal-supported powder produced by the method of producing the noble metal-supported powder according to the present invention is coated on the refractory inorganic substrate, or the one in which at least one catalyst layer is provided on the refractory inorganic substrate, and the noble metal-supported powder according to the present invention is contained in the catalyst layer.

Figure 5:
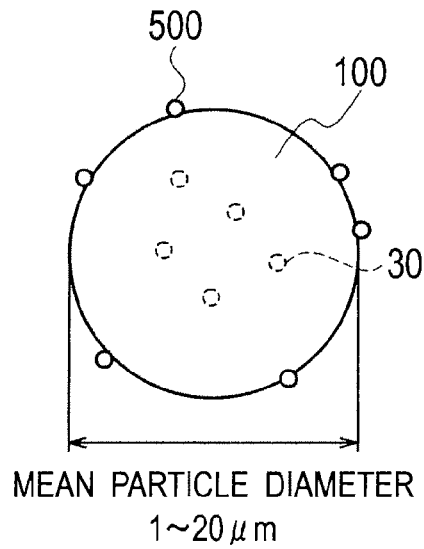
FIG. 5 is a schematic view of conventional noble metal-supported powder.

In order to clarify an advantage of the noble metal-supported powder according to the embodiment of the present invention, which is shown in FIG. 2, a schematic view of the conventional noble metal-supported powder is shown in FIG. 5 for comparison. Noble metal-supported powder 100 shown in FIG. 5 is the one in which noble metal particles 300 are present at portions, which are poor in gas flow, in an inside of the noble metal-supported powder 100 with a mean particle diameter approximately ranging from 1 to 20 [μm], and noble metal particles 500 are formed on a surface of the noble metal-supported powder 100. Hence, the exhaust gas to be purified does not sufficiently reach the noble metal particles 300, and accordingly, the noble metal particles 300 have not functioned effectively to purify the exhaust gas. As opposed to this, in the noble metal-supported powder 1 according to the embodiment of the present invention, which is shown in FIG. 2, the pores 2 effective in the gas diffusion are formed to the inside thereof, and the noble metal in the inside of the powder can also be used effectively. This is obvious from a difference in structure between the powder illustrated in FIG. 5 and the powder illustrated in FIG. 2.

EXAMPLES

A description will be specifically made below of the present invention based on examples.

Example 1

Pt-supported powder was pulverized so that a mean particle diameter thereof could become 150 [nm], and was turned into Pt-supported powder particles. Alumina ($Al_2O_3$) was used as a material of the powder that supported Pt thereon. Moreover, a wet pulverizer using a pulverization medium was used for pulverizing the Pt-supported powder.

The Pt-supported powder particles and a binder were mixed with each other in a weight ratio of 50:50, and were turned into slurry with a solid concentration of approximately 10%. Here, as the binder, the one was used, which contained the alumina as a main component, and had a mean particle diameter that was ½ of that of the Pt-supported powder particles.

Immediately before drying the slurry obtained by mixing the Pt-supported powder particles and the binder with each other, degree of dispersion of the slurry was set at 91%. Such setting of the degree of dispersion was performed in such a manner that an ultrasonic dispersing device was arranged immediately before a rapid dryer, and the slurry was dispersed while adjusting a high dispersion output of the ultrasonic dispersing device so that the target degree of dispersion can be obtained, and was supplied to the rapid dryer within 1 minute after such high dispersion treatment. Here, for measurement for calculating the degree of dispersion, a grain size distribution measuring apparatus of the dynamic light scattering mode was used, and the degree of dispersion was calculated by the following Expression (1).

[Degree of dispersion](%)=[Mean particle diameter]/
[Dispersion state measurement result]×100 (1)

Next, the slurry, which was obtained by mixing the Pt-supported powder particles and the binder with each other and was subjected to the high dispersion treatment, was rapidly dried in a liquid droplet state. For drying the slurry, a spray dryer as a rapid dryer was used. An inlet temperature of the spray dryer was set at 350° C., and an amount of heat applied to the slurry and a slurry treatment rate were adjusted so that an outlet temperature of the spray dryer could become 140° C. Here, a mean particle diameter of the liquid droplets was set at approximately 10 [μm].

Powder obtained by drying the slurry was subjected to heating treatment at 550° C. for 3 hours. A muffle furnace was used for the heating treatment. In such a way, Pt-supported powder was obtained (powder A).

A pore distribution of the obtained powder was measured, and a volume ratio of pores effective in the gas diffusion, which were present in a particle inside, was calculated by the following Expression (2).

[Volume ratio of pores effective in gas diffusion]=
[Volume of pores with a diameter of 30 to 100
nm]/[Volume of powder] (2)

In Expression (2), the gas diffusion in the pores with a diameter of less than 100 [nm] is referred to as Knudsen diffusion, and is represented by Expression (3).

$q=(4/3)\cdot r\epsilon(2RT/\pi M)^{1/2}\cdot\{(p_1-p_2)/(l\cdot RT)\}$ (3)

where q is a gas flow rate per unit area and unit time, r is a radius of the pores, $\epsilon$ is porosity, R is a gas constant, T is an absolute temperature, M is a molecular weight of the gas, p1 and p2 are pressures of the gas on both sides of the pores, and l is a length of the pores.

Figure 6:
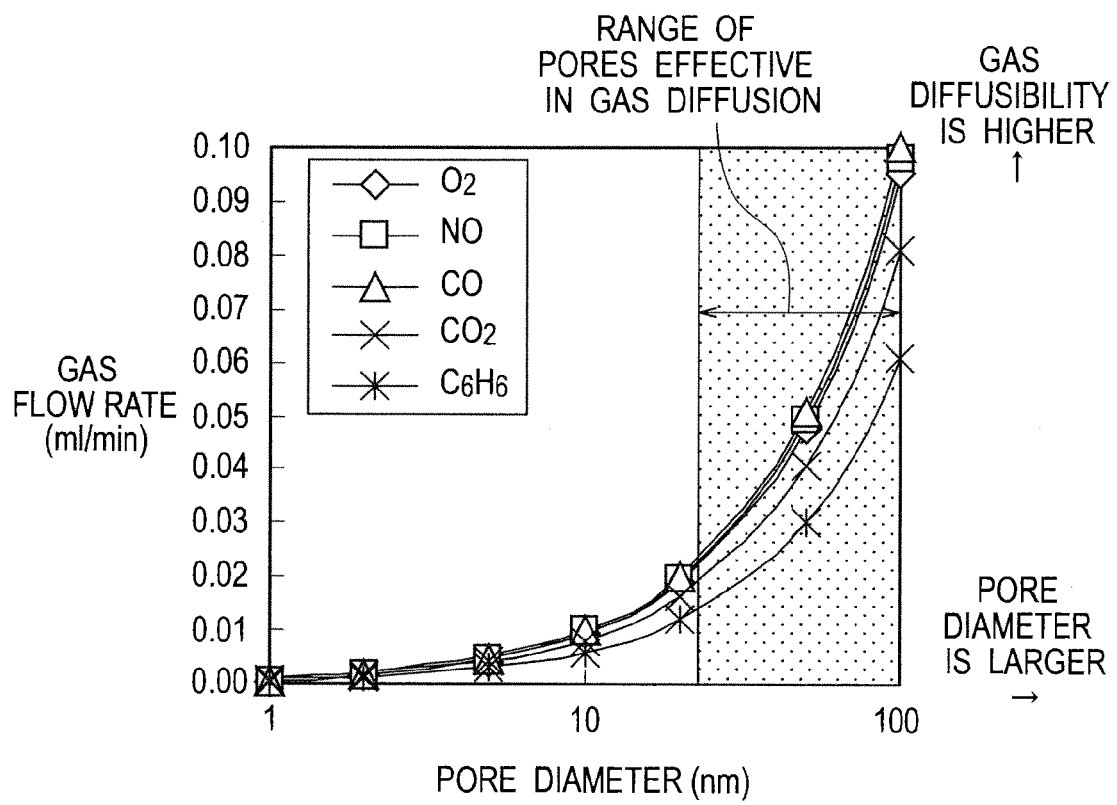
FIG. 6 is a graph showing relationships between pore diameters and flow rates of various gases in Knudsen diffusion.

Relationships between the pore diameters and flow rates of various gases in the Knudsen diffusion are shown by a graph in FIG. 6. From FIG. 6, it is seen that, among the pores of the powder, pores with a diameter of 30 to 100 [nm] are effective in the gas diffusion. Therefore, the volume ratio of the pores effective in the gas diffusion was defined as in Expression (2).

In Example 1, the above-described volume ratio of the pores effective in the gas diffusion was 23.8%.

Example 2

Example 2 is an example of an exhaust gas purifying catalyst using the noble metal-supported powder of Example 1.

98.2 g of the powder A obtained in Example 1, 13.5 g of alumina sol, further 177.6 g of water, and 10.8 g of a 10% aqueous nitric acid solution were added to one another to obtain slurry. The slurry thus obtained was pulverized by the wet pulverizer using the pulverization medium, and was turned to slurry with a mean particle diameter of 3 [μm] (slurry A).

This slurry A was coated on a honeycomb support made of ceramics, followed by drying, and was thereafter baked at 400° C. for 1 hour, whereby a catalyst was formed (catalyst A).

A durability test was performed for this catalyst A. In the durability test, the catalyst A was mounted on an exhaust system of a gasoline engine with a displacement of 3500 cc, an inlet temperature of the catalyst was set at 900° C., and the gasoline engine was operated for 30 hours.

With regard to the catalyst A after being subjected to the durability test, a conversion rate of hydrocarbon when the inlet temperature of the catalyst was 400° C. was obtained in accordance with the following expression in the state where the catalyst was mounted on the exhaust system of the gasoline engine with a displacement of 3500 cc.

HC conversion rate(%)=[(Catalyst inlet HC concentration)−(Catalyst outlet HC concentration)]/
(Catalyst inlet HC concentration)×100

At this time, the HC conversion rate was 44%, which was equal to or larger than a conversion rate (40%) necessary in this evaluation condition in order to achieve target performance (Japanese exhaust gas regulation value (reduction level) in 2005: −75%).

With regard to the catalyst A after being subjected to the durability test, powder was sampled from a catalyst coating layer thereof, and a crystallite diameter thereof was calculated from a full width at half maximum of an XRD reflection peak of Pt (111). At this time, the crystallite diameter was 12 [nm].

Example 3

Example 3 is an example of the noble metal-supported powder containing Ce and the exhaust gas purifying catalyst using the noble metal-supported powder.

Pt-supported powder in which a supporting concentration of Pt was set twice that of Example 1 was pulverized so that a mean particle diameter thereof could become 150 [nm], and was turned into Pt-supported powder particles. Alumina ($Al_2O_3$) was used as a material of the powder that supported Pt thereon. Moreover, the wet pulverizer using the pulverization medium was used for pulverizing the Pt-supported powder.

Moreover, oxide powder containing Ce was pulverized so that a mean particle diameter thereof could become 150 [nm], and was turned into Ce-containing oxide powder particles. The wet pulverizer using the pulverization medium was used for pulverizing the Ce-containing oxide powder. Note that, on this Ce-containing oxide powder, there may be supported: the oxide of at least one type of the metal selected from Mn, Fe, Co, Ni, Y, Ba, Zr, La, Pr and Nd; and/or the at least one type of noble metal selected from Au, Pt, Ir, Os, Ag, Pd, Rh and Ru.

The above-described Pt-supported powder particles, the above-described Ce-containing oxide powder particles and a binder were mixed with one another in a weight ratio of 25:25:50, and were turned into slurry with a solid concentration of approximately 10%. Here, as the binder, the one was used, which contained the alumina as a main component, and had a mean particle diameter that was 10 times that of the Pt-supported powder particles.

Immediately before drying the slurry obtained by mixing the Pt-supported powder particles, the Ce-containing oxide powder particles and the binder with one another, degree of dispersion of the slurry was set at 91%. Such setting of the degree of dispersion was performed in such a manner that the ultrasonic dispersing device was arranged immediately before the rapid dryer, the high dispersion output thereof was adjusted so as to obtain the target degree of dispersion, and the slurry was supplied to the rapid dryer within 1 minute after the high dispersion treatment. Here, for the measurement for calculating the degree of dispersion, the grain size distribution measuring apparatus of the dynamic light scattering mode was used, and the degree of dispersion was calculated by the above-mentioned Expression (1).

A process from drying of the slurry subjected to the high dispersion treatment to heating treatment thereof is the same as that of Example 1. In such a way, Pt-supported powder was obtained (powder B).

A pore distribution of the obtained powder was measured, and a volume ratio of the pores effective in the gas diffusion, which were present in the particle inside, was calculated by the above-mentioned Expression (2). At this time, the volume ratio of the pores effective in the gas diffusion was 23.8%.

A process from preparation of slurry (slurry B) containing the powder B through coating, drying and baking thereof to formation of a catalyst (catalyst B) is the same as that of Example 2.

A durability test was performed for this catalyst B. In the durability test, the catalyst B was mounted on the exhaust system of the gasoline engine with a displacement of 3500 cc, an inlet temperature of the catalyst was set at 900° C., and the gasoline engine was operated for 30 hours.

With regard to the catalyst B after being subjected to the durability test, the catalyst was mounted on the exhaust system of the gasoline engine with a displacement of 3500 cc, and a conversion rate of hydrocarbon when the inlet temperature of the catalyst was 400° C. was obtained in accordance with the following expression.

HC conversion rate(%)=[(Catalyst inlet HC concentration)−(Catalyst outlet HC concentration)]/(Catalyst inlet HC concentration)×100

At this time, the HC conversion rate was 46%, which was equal to or larger than the conversion rate (40%) necessary in this evaluation condition in order to achieve the target performance (Japanese exhaust gas regulation value (reduction level) in 2005: −75%).

Example 4

Example 4 is an example in which degree of dispersion of slurry is different from that of Example 4.

A process to preparation of mixed slurry of Pt-supported powder particles and a binder is the same as that of Example 1.

Immediately before drying the slurry obtained by mixing the Pt-supported powder particles and the binder with each other, the degree of dispersion of the slurry was set at 50%. Such setting of the degree of dispersion was performed in such a manner that the ultrasonic dispersing device was arranged immediately before the rapid dryer, the high dispersion output thereof was adjusted so as to obtain the target degree of dispersion, and the slurry was supplied to the rapid dryer within 1 minute after the high dispersion treatment. Here, for the measurement for calculating the degree of dispersion, the grain size distribution measuring apparatus of the dynamic light scattering mode was used, and the degree of dispersion was calculated by the above-mentioned Expression (1).

A process from drying of the slurry subjected to the high dispersion treatment to heating treatment thereof is the same as that of Example 1. In such a way, Pt-supported powder was obtained (powder C).

A process from preparation of slurry (slurry C) containing the powder C through coating, drying and baking thereof to formation of a catalyst (catalyst C) is the same as that of Example 2.

A durability test was performed for this catalyst C. In the durability test, the catalyst C was mounted on the exhaust system of the gasoline engine with a displacement of 3500 cc, an inlet temperature of the catalyst was set at 900° C., and the gasoline engine was operated for 30 hours.

With regard to the catalyst C after being subjected to the durability test, the catalyst was mounted on the exhaust system of the gasoline engine with a displacement of 3500 cc, and a conversion rate of hydrocarbon when the inlet temperature of the catalyst was 400° C. was obtained in accordance with the following expression.

HC conversion rate(%)=[(Catalyst inlet HC concentration)−(Catalyst outlet HC concentration)]/(Catalyst inlet HC concentration)×100

At this time, the HC conversion rate was 42%, which was equal to or larger than the conversion rate (40%) necessary in this evaluation condition in order to achieve the target performance (Japanese exhaust gas regulation value (reduction level) in 2005: −75%).

Example 5

Example 5 is an example in which degree of dispersion of slurry is different from those of Examples 1 and 2.

A process to preparation of mixed slurry of Pt-supported powder particles and a binder is the same as that of Example 1.

Immediately before drying the slurry obtained by mixing the Pt-supported powder particles and the binder with each other, the degree of dispersion of the slurry was set at 33%. Such setting of the degree of dispersion was performed in such a manner that the high-speed stirrer was arranged immediately before the rapid dryer, the number of revolutions of a stirring impeller thereof was adjusted so as to obtain the target degree of dispersion, and the slurry was supplied to the rapid dryer within 1 minute after the high-speed stirring treatment. Here, for the measurement for calculating the degree of dispersion, the grain size distribution measuring apparatus of the dynamic light scattering mode was used, and the degree of dispersion was calculated by the above-mentioned Expression (1).

A process from drying of the slurry subjected to the high-speed stirring treatment to heating treatment thereof is the same as that of Example 1. In such a way, Pt-supported powder was obtained (powder D).

A process from preparation of slurry (slurry D) containing the powder D through coating, drying and baking thereof to formation of a catalyst (catalyst D) is the same as that of Example 2.

A durability test was performed for this catalyst D. In the durability test, the catalyst D was mounted on the exhaust system of the gasoline engine with a displacement of 3500 cc, an inlet temperature of the catalyst was set at 900° C., and the gasoline engine was operated for 30 hours.

With regard to the catalyst D after being subjected to the durability test, the catalyst was mounted on the exhaust system of the gasoline engine with a displacement of 3500 cc, and a conversion rate of hydrocarbon when the inlet temperature of the catalyst was 400° C. was obtained in accordance with the following expression.

HC conversion rate(%)=[(Catalyst inlet HC concentration)−(Catalyst outlet HC concentration)]/(Catalyst inlet HC concentration)×100

At this time, the HC conversion rate was 40%, which was equal to or larger than the conversion rate (40%) necessary in this evaluation condition in order to achieve the target performance (Japanese exhaust gas regulation value (reduction level) in 2005: −75%).

With regard to the catalyst D after being subjected to the durability test, powder was sampled from a catalyst coating layer thereof, and a crystallite diameter thereof was calculated from a full width at half maximum of the XRD reflection peak of Pt (111). At this time, the crystallite diameter was 15 [nm].

Example 6

Example 6 is an example in which a drying time of slurry is different from that of Example 1.

A process to preparation of mixed slurry of Pt-supported powder particles and a binder is the same as that of Example 1.

Immediately before drying the slurry obtained by mixing the Pt-supported powder particles and the binder with each other, the degree of dispersion of the slurry was set at 91%. Such setting of the degree of dispersion was performed in such a manner that the ultrasonic dispersing device was arranged immediately before the rapid dryer, the high dispersion output thereof was adjusted so as to obtain the target degree of dispersion, and the slurry was supplied to the rapid dryer within 1 minute after the high dispersion treatment. Here, for the measurement for calculating the degree of dispersion, the grain size distribution measuring apparatus of the dynamic light scattering mode was used, and the degree of dispersion was calculated by the above-mentioned Expression (1).

Next, the slurry, which was obtained by mixing the Pt-supported powder particles and the binder with each other and was subjected to the high dispersion treatment, was dried within 1 second per piece of the liquid droplets. For drying the slurry, the spray dryer as the rapid dryer was used. The inlet temperature of the spray dryer was set at 200° C., and the amount of heat applied to the slurry and the slurry treatment rate were adjusted so that the outlet temperature of the spray dryer could become 70° C. Here, the mean particle diameter of the liquid droplets was set at approximately 120 [μm].

Powder obtained by drying the slurry was subjected to heating treatment at 550° C. for 3 hours. The muffle furnace was used for the heating treatment. In such a way, Pt-supported powder was obtained (powder E).

A pore distribution of the obtained powder was measured, and a volume ratio of the pores effective in the gas diffusion, which were present in the particle inside, was calculated by the above-mentioned Expression (2). At this time, the volume ratio of the pores effective in the gas diffusion was 22.0%.

Example 7

Example 7 is an example of an exhaust gas purifying catalyst using the noble metal-supported powder of Example 6.

A process from preparation of slurry (slurry E) containing the powder E through coating, drying and baking thereof to formation of a catalyst (catalyst E) is the same as that of Example 2.

A durability test was performed for this catalyst E. In the durability test, the catalyst D was mounted on the exhaust system of the gasoline engine with a displacement of 3500 cc, an inlet temperature of the catalyst was set at 900° C., and the gasoline engine was operated for 30 hours.

With regard to the catalyst E after being subjected to the durability test, the catalyst was mounted on the exhaust system of the gasoline engine with a displacement of 3500 cc, and a conversion rate of hydrocarbon when the inlet temperature of the catalyst was 400° C. was obtained in accordance with the following expression.

HC conversion rate(%)=[(Catalyst inlet HC concentration)−(Catalyst outlet HC concentration)]/(Catalyst inlet HC concentration)×100

At this time, the HC conversion rate was 40%, which was equal to or larger than the conversion rate (40%) necessary in this evaluation condition in order to achieve the target performance (Japanese exhaust gas regulation value (reduction level) in 2005: −75%).

Example 8

Example 8 is an example in which a particle diameter of a binder is different from those of Examples 1 and 2.

Pt-supported powder was pulverized so that a mean particle diameter thereof could become 150 [nm], and was turned into Pt-supported powder particles. Alumina ($Al_2O_3$) was used as a material of the powder that supported Pt thereon. Moreover, the wet pulverizer using the pulverization medium was used for pulverizing the Pt-supported powder.

The Pt-supported powder particles and a binder were mixed with each other in a weight ratio of 50:50, and were turned into slurry with a solid concentration of approximately 10%. Here, as the binder, the one was used, which contained the alumina as a main component, and had a mean particle diameter that was 10 times that of the Pt-supported powder particles.

Immediately before drying the slurry obtained by mixing the Pt-supported powder particles and the binder with each other, degree of dispersion of the slurry was set at 91%. Such setting of the degree of dispersion was performed in such a manner that the ultrasonic dispersing device was arranged immediately before the rapid dryer, the high dispersion output thereof was adjusted so as to obtain the target degree of dispersion, and the slurry was supplied to the rapid dryer within 1 minute after the high dispersion treatment. Here, for the measurement for calculating the degree of dispersion, the grain size distribution measuring apparatus of the dynamic light scattering mode was used, and the degree of dispersion was calculated by the above-mentioned Expression (1).

A process from drying of the slurry subjected to the high dispersion treatment to heating treatment thereof is the same as that of Example 1. In such a way, Pt-supported powder was obtained (powder F).

A process from preparation of slurry (slurry F) containing the powder F through coating, drying and baking thereof to formation of a catalyst (catalyst F) is the same as that of Example 2.

A durability test was performed for this catalyst F. In the durability test, the catalyst F was mounted on the exhaust system of the gasoline engine with a displacement of 3500 cc, an inlet temperature of the catalyst was set at 900° C., and the gasoline engine was operated for 30 hours.

With regard to the catalyst F after being subjected to the durability test, powder was sampled from a catalyst coating layer thereof, and a crystallite diameter thereof was calculated from a full width at half maximum of the XRD reflection peak of Pt (111). At this time, the crystallite diameter was 15 [nm].

Example 9

Example 9 is an example in which a mixing ratio of noble metal-supported powder particles and a binder is different from those of Examples 1 and 2.

Pt-supported powder was pulverized so that a mean particle diameter thereof could become 150 [nm], and was turned into Pt-supported powder particles. Alumina ($Al_2O_3$) was used as a material of the powder that supported Pt thereon. Moreover, the wet pulverizer using the pulverization medium was used for pulverizing the Pt-supported powder.

The Pt-supported powder particles and a binder were mixed with each other in a weight ratio of 90:10, and were turned into slurry with a solid concentration of approximately 10%. Here, as the binder, the one was used, which contained the alumina as a main component, and had a mean particle diameter that was ½ of that of the Pt-supported powder particles.

Immediately before drying the slurry obtained by mixing the Pt-supported powder particles and the binder with each other, degree of dispersion of the slurry was set at 91%. Such setting of the degree of dispersion was performed in such a manner that the ultrasonic dispersing device was arranged immediately before the rapid dryer, the high dispersion output thereof was adjusted so as to obtain the target degree of dispersion, and the slurry was supplied to the rapid dryer within 1 minute after the high dispersion treatment. Here, for the measurement for calculating the degree of dispersion, the grain size distribution measuring apparatus of the dynamic light scattering mode was used, and the degree of dispersion was calculated by the above-mentioned Expression (1).

A process from drying of the slurry subjected to the high dispersion treatment to heating treatment thereof is the same as that of Example 1. In such a way, Pt-supported powder was obtained (powder G).

A process from preparation of slurry (slurry G) containing the powder G through coating, drying and baking thereof to formation of a catalyst (catalyst G) is the same as that of Example 2.

A durability test was performed for this catalyst G. In the durability test, the catalyst G was mounted on the exhaust system of the gasoline engine with a displacement of 3500 cc, an inlet temperature of the catalyst was set at 900° C., and the gasoline engine was operated for 30 hours.

With regard to the catalyst G after being subjected to the durability test, powder was sampled from a catalyst coating layer thereof, and a crystallite diameter thereof was calculated from a full width at half maximum of the XRD reflection peak of Pt (111). At this time, the crystallite diameter was 15 [nm].

Example 10

Example 10 is an example in which a particle diameter of noble metal-supported powder particles is different from those of Examples 1 and 2.

Pt-supported powder was pulverized so that a mean particle diameter thereof could become 105 [nm], and was turned into Pt-supported powder particles. Alumina ($Al_2O_3$) was used as a material of the powder that supported Pt thereon. Moreover, the wet pulverizer using the pulverization medium was used for pulverizing the Pt-supported powder.

The Pt-supported powder particles and a binder were mixed with each other in a weight ratio of 50:50, and were turned into slurry with a solid concentration of approximately 10%. Here, as the binder, the one was used, which contained the alumina as a main component, and had a mean particle diameter that was ½ of that of the Pt-supported powder particles.

A process from high dispersion treatment of slurry obtained by mixing the Pt-supported powder particles and the binder with each other to heating treatment thereof is the same as that of Example 1.

In such a way, Pt-supported powder was obtained (powder O).

A pore distribution of the obtained powder was measured, and a volume ratio of the pores effective in the gas diffusion, which were present in the particle inside, was calculated by the above-mentioned Expression (2). At this time, the volume ratio of the pores effective in the gas diffusion was 22.3%.

Comparative Example 1

Comparative example 1 is an example in which the mean particle diameter of the noble metal-supported powder particles is large.

Pt-supported powder in which a supporting concentration of Pt was set at a half of that of Example 1 was pulverized so that a mean particle diameter thereof could become 3 [µm]. A dry pulverizer using a pulverization medium was used for pulverizing the Pt-supported powder. In such a way, Pt-supported powder was obtained (powder H).

A pore distribution of the obtained powder was measured, and a volume ratio of the pores effective in the gas diffusion, which were present in the particle inside, was calculated by the above-mentioned Expression (2). At this time, the volume ratio of the pores effective in the gas diffusion was 10.8%.

Comparative Example 2

Comparative example 2 is an example of an exhaust gas purifying catalyst using the noble metal-supported powder of Comparative example 1.

A process from preparation of slurry (slurry H) containing the powder H through coating, drying and baking thereof to formation of a catalyst (catalyst H) is the same as that of Example 2.

A durability test was performed for this catalyst H. In the durability test, the catalyst H was mounted on the exhaust system of the gasoline engine with a displacement of 3500 cc, an inlet temperature of the catalyst was set at 900° C., and the gasoline engine was operated for 30 hours.

With regard to the catalyst H after being subjected to the durability test, the catalyst was mounted on the exhaust system of the gasoline engine with a displacement of 3500 cc, and a conversion rate of hydrocarbon when the inlet temperature of the catalyst was 400° C. was obtained in accordance with the following expression.

HC conversion rate(%)=[(Catalyst inlet HC concentration)−(Catalyst outlet HC concentration)]/(Catalyst inlet HC concentration)×100

At this time, the HC conversion rate was 5%.

With regard to the catalyst H after being subjected to the durability test, powder was sampled from a catalyst coating layer thereof, and a crystallite diameter thereof was calculated from a full width at half maximum of the XRD reflection peak of Pt (111). At this time, the crystallite diameter was 100 [nm].

Comparative Example 3

Comparative example 3 is an example in which the slurry was not subjected to the dispersion treatment, but was dried slowly.

A process to preparation of mixed slurry of Pt-supported powder particles and a binder is the same as that of Example 1.

The slurry obtained by mixing the Pt-supported powder particles and the binder with each other was not subjected to the dispersion treatment, but was dried at a speed equivalent to approximately 150 sec per piece of liquid droplets with a mean particle diameter of approximately 1000 [μm]. Such drying of the slurry was performed in such a manner that the slurry was dried at reduced pressure in an evaporator, and was thereafter dried in a dryer of 120° C.

Powder obtained by drying the slurry was subjected to heating treatment at 550° C. for 3 hours. The muffle furnace was used for the heating treatment. In such a way, Pt-supported powder was obtained (powder I).

A pore distribution of the obtained powder was measured, and a volume ratio of the pores effective in the gas diffusion, which were present in the particle inside, was calculated by the above-mentioned Expression (2). At this time, the volume ratio of the pores effective in the gas diffusion was 20.3%.

Comparative Example 4

Comparative example 4 is an example of an exhaust gas purifying catalyst using the noble metal-supported powder of Comparative example 3.

A process from preparation of slurry (slurry I) containing powder I through coating, drying and baking thereof to formation of a catalyst (catalyst I) is the same as that of Example 2.

A durability test was performed for this catalyst I. In the durability test, the catalyst I was mounted on the exhaust system of the gasoline engine with a displacement of 3500 cc, an inlet temperature of the catalyst was set at 900° C., and the gasoline engine was operated for 30 hours.

With regard to the catalyst I after being subjected to the durability test, the catalyst was mounted on the exhaust system of the gasoline engine with a displacement of 3500 cc, and a conversion rate of hydrocarbon when the inlet temperature of the catalyst was 400° C. was obtained in accordance with the following expression.

HC conversion rate(%)=[(Catalyst inlet HC concentration)−(Catalyst outlet HC concentration)]/(Catalyst inlet HC concentration)×100

At this time, the HC conversion rate was 10%.

Comparative Example 5

Comparative example 5 is an example in which the degree of dispersion of the slurry is small.

A process to preparation of mixed slurry of Pt-supported powder particles and a binder is the same as that of Example 1.

Immediately before drying the slurry obtained by mixing the Pt-supported powder particles and the binder with each other, the degree of dispersion of the slurry was set at 25%. Such setting of the degree of dispersion was performed in such a manner that the high-speed stirrer was arranged immediately before the rapid dryer, the number of revolutions of the stirring impeller thereof was adjusted so as to obtain the target degree of dispersion, and the slurry was supplied to the rapid dryer within 1 minute after the high-speed stirring treatment. Here, for the measurement for calculating the degree of dispersion, the grain size distribution measuring apparatus of the dynamic light scattering mode was used, and the degree of dispersion was calculated by the above-mentioned Expression (1).

A process from drying of the slurry subjected to the high-speed stirring treatment to heating treatment thereof is the same as that of Example 1. In such a way, Pt-supported powder was obtained (powder J).

A process from preparation of slurry (slurry J) containing the powder J through coating, drying and baking thereof to formation of a catalyst (catalyst J) is the same as that of Example 2.

A durability test was performed for this catalyst J. In the durability test, the catalyst J was mounted on the exhaust system of the gasoline engine with a displacement of 3500 cc, an inlet temperature of the catalyst was set at 900° C., and the gasoline engine was operated for 30 hours.

With regard to the catalyst J after being subjected to the durability test, the catalyst was mounted on the exhaust system of the gasoline engine with a displacement of 3500 cc, and a conversion rate of hydrocarbon when the inlet temperature of the catalyst was 400° C. was obtained in accordance with the following expression.

HC conversion rate(%)=[(Catalyst inlet HC concentration)−(Catalyst outlet HC concentration)]/ (Catalyst inlet HC concentration)×100

At this time, the HC conversion rate was 30%.

Comparative Example 6

Comparative example 6 is an example in which the degree of dispersion of the slurry is small.

A process to preparation of mixed slurry of Pt-supported powder particles and a binder is the same as that of Example 1.

The slurry obtained by mixing the Pt-supported powder particles and the binder with each other was not subjected to the dispersion treatment, but was rapidly dried in a state of liquid droplets. The spray dyer as the rapid dryer was used for drying the slurry, the inlet temperature of the spray dryer was set at 350° C., and the amount of heat applied to the slurry and the slurry treatment rate were adjusted so that the outlet temperature of the spray dryer could become 140° C. Here, the mean particle diameter of the liquid droplets was set at approximately 10 [μm].

Note that the degree of dispersion of the slurry, which was measured immediately before drying the slurry, was 19%. Here, for the measurement for calculating the degree of dispersion, the grain size distribution measuring apparatus of the dynamic light scattering mode was used, and the degree of dispersion was calculated by the above-mentioned Expression (1).

Powder obtained by drying the slurry was subjected to heating treatment at 550° C. for 3 hours. The muffle furnace was used for the heating treatment. In such a way, Pt-supported powder was obtained (powder K).

A process from preparation of slurry (slurry K) containing the powder K through coating, drying and baking thereof to formation of a catalyst (catalyst K) is the same as that of Example 2.

A durability test was performed for this catalyst K. In the durability test, the catalyst K was mounted on the exhaust system of the gasoline engine with a displacement of 3500 cc, an inlet temperature of the catalyst was set at 900° C., and the gasoline engine was operated for 30 hours.

With regard to the catalyst K after being subjected to the durability test, the catalyst was mounted on the exhaust system of the gasoline engine with a displacement of 3500 cc, and a conversion rate of hydrocarbon when the inlet temperature of the catalyst was 400° C. was obtained in accordance with the following expression.

HC conversion rate(%)=[(Catalyst inlet HC concentration)−(Catalyst outlet HC concentration)]/ (Catalyst inlet HC concentration)×100

At this time, the HC conversion rate was 15%.

With regard to the catalyst K after being subjected to the durability test, powder was sampled from a catalyst coating layer thereof, and a crystallite diameter thereof was calculated from a full width at half maximum of the XRD reflection peak of Pt (111). At this time, the crystallite diameter was 29 [nm].

Comparative Example 7

Comparative example 7 is an example in which the mean particle diameter of the binder is 20 times that of the noble metal-supported powder particles.

Pt-supported powder was pulverized so that a mean particle diameter thereof could become 150 [nm], and was turned into Pt-supported powder particles. Alumina ($Al_2O_3$) was used as a material of the powder that supported Pt thereon. Moreover, the wet pulverizer using the pulverization medium was used for pulverizing the Pt-supported powder.

The Pt-supported powder particles and a binder were mixed with each other in a weight ratio of 50:50, and were turned into slurry with a solid concentration of approximately 10%. Here, as the binder, the one was used, which contained the alumina as a main component, and had a mean particle diameter that was 20 times that of the Pt-supported powder particles.

Immediately before drying the slurry obtained by mixing the Pt-supported powder particles and the binder with each other, degree of dispersion of the slurry was set at 91%. Such setting of the degree of dispersion was performed in such a manner that the ultrasonic dispersing device was arranged immediately before the rapid dryer, the high dispersion output thereof was adjusted so as to obtain the target degree of dispersion, and the slurry was supplied to the rapid dryer within 1 minute after the high dispersion treatment. Here, for the measurement for calculating the degree of dispersion, the grain size distribution measuring apparatus of the dynamic light scattering mode was used, and the degree of dispersion was calculated by the above-mentioned Expression (1).

A process from drying of the slurry subjected to the high dispersion treatment to heating treatment thereof is the same as that of Example 1. In such a way, Pt-supported powder was obtained (powder L).

A process from preparation of slurry (slurry L) containing the powder L through coating, drying and baking thereof to formation of a catalyst (catalyst L) is the same as that of Example 2.

A durability test was performed for this catalyst L. In the durability test, the catalyst L was mounted on the exhaust system of the gasoline engine with a displacement of 3500 cc, an inlet temperature of the catalyst was set at 900° C., and the gasoline engine was operated for 30 hours.

With regard to the catalyst L after being subjected to the durability test, powder was sampled from a catalyst coating layer thereof, and a crystallite diameter thereof was calculated from a full width at half maximum of the XRD reflection peak of Pt (111). At this time, the crystallite diameter was 35 [nm].

Comparative Example 8

Comparative example 8 is an example in which an amount of the binder is smaller than that of the noble metal-supported powder.

Pt-supported powder was pulverized so that a mean particle diameter thereof could become 150 [nm], and was turned into Pt-supported powder particles. Alumina ($Al_2O_3$) was used as a material of the powder that supported Pt thereon. Moreover, the wet pulverizer using the pulverization medium was used for pulverizing the Pt-supported powder.

The Pt-supported powder particles and a binder were mixed with each other in a weight ratio of 95:5, and were turned into slurry with a solid concentration of approximately 10%. Here, as the binder, the one was used, which contained the alumina as a main component, and had a mean particle diameter that was ½ of that of the Pt-supported powder particles.

Immediately before drying the slurry obtained by mixing the Pt-supported powder particles and the binder with each other, degree of dispersion of the slurry was set at 91%. Such setting of the degree of dispersion was performed in such a manner that the ultrasonic dispersing device was arranged immediately before the rapid dryer, the high dispersion output thereof was adjusted so as to obtain the target degree of dispersion, and the slurry was supplied to the rapid dryer within 1 minute after the high dispersion treatment. Here, for the measurement for calculating the degree of dispersion, the grain size distribution measuring apparatus of the dynamic light scattering mode was used, and the degree of dispersion was calculated by the above-mentioned Expression (1).

A process from drying of the slurry subjected to the high dispersion treatment to heating treatment thereof is the same as that of Example 1. In such a way, Pt-supported powder was obtained (powder M).

A process from preparation of slurry (slurry M) containing the powder M through coating, drying and baking thereof to formation of a catalyst (catalyst M is the same as that of Example 2.

A durability test was performed for this catalyst M. In the durability test, the catalyst M was mounted on the exhaust system of the gasoline engine with a displacement of 3500 cc, an inlet temperature of the catalyst was set at 900° C., and the gasoline engine was operated for 30 hours.

With regard to the catalyst M after being subjected to the durability test, powder was sampled from a catalyst coating layer thereof, and a crystallite diameter thereof was calculated from a full width at half maximum of the XRD reflection peak of Pt (111). At this time, the crystallite diameter was 42 [nm].

Comparative Example 9

Comparative example 9 is an example in which the mean particle diameter of the noble metal-supported powder particles is small.

Pt-supported powder was pulverized so that a mean particle diameter thereof could become 50 [nm], and was turned into Pt-supported powder particles. Alumina ($Al_2O_3$) was used as a material of the powder that supported Pt thereon. Moreover, the wet pulverizer using the pulverization medium was used for pulverizing the Pt-supported powder.

The Pt-supported powder particles and a binder were mixed with each other in a weight ratio of 50:50, and were turned into slurry with a solid concentration of approximately 10%. Here, as the binder, the one was used, which contained the alumina as a main component, and had a mean particle diameter that was ½ of that of the Pt-supported powder particles.

A process from high dispersion treatment of slurry obtained by mixing the Pt-supported powder particles and the binder with each other to heating treatment thereof is the same as that of Example 1.

In such a way, Pt-supported powder was obtained (powder N).

A pore distribution of the obtained powder was measured, and a volume ratio of the pores effective in the gas diffusion, which were present in the particle inside, was calculated by the above-mentioned Expression (2). At this time, the volume ratio of the pores effective in the gas diffusion was 20.9%.

Characteristics related to the examples and the comparative examples, which are mentioned above, are shown in FIGS. 7 to 15.

Figure 7:
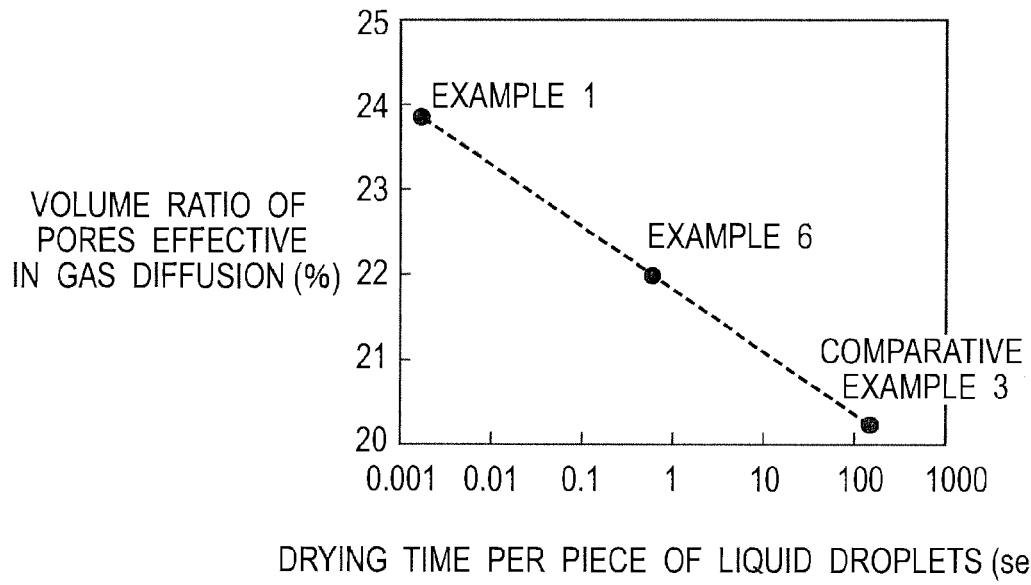
FIG. 7 is a graph showing a relationship between each drying time of the noble metal-supported powder per piece of the liquid droplets and each volume ratio of the pores thereof effective in gas diffusion.

FIG. 7 is a graph showing a relationship between each drying time of the noble metal-supported powder per piece of the liquid droplets and each volume ratio of the pores thereof effective in the gas diffusion. As apparent from FIG. 7, in Example 1 and Example 6, in which the drying time per piece of the liquid droplets is short, a larger number of the pores effective in the gas diffusion were able to be formed in the inside of the noble meta-supported powder in comparison with Comparative example 3 in which the drying time is approximately 150 [sec]. In particular, in Example 6 in which the drying time per piece of the liquid droplets was set within 1 second, the volume ratio of the pores effective in the gas diffusion was able to be set at 22% or more. Moreover, in Example 1 in which the slurry was rapidly dried in the state of the liquid droplets, the volume ratio of the pores effective in the gas diffusion was enhanced remarkably to 23.8%.

Figure 8:
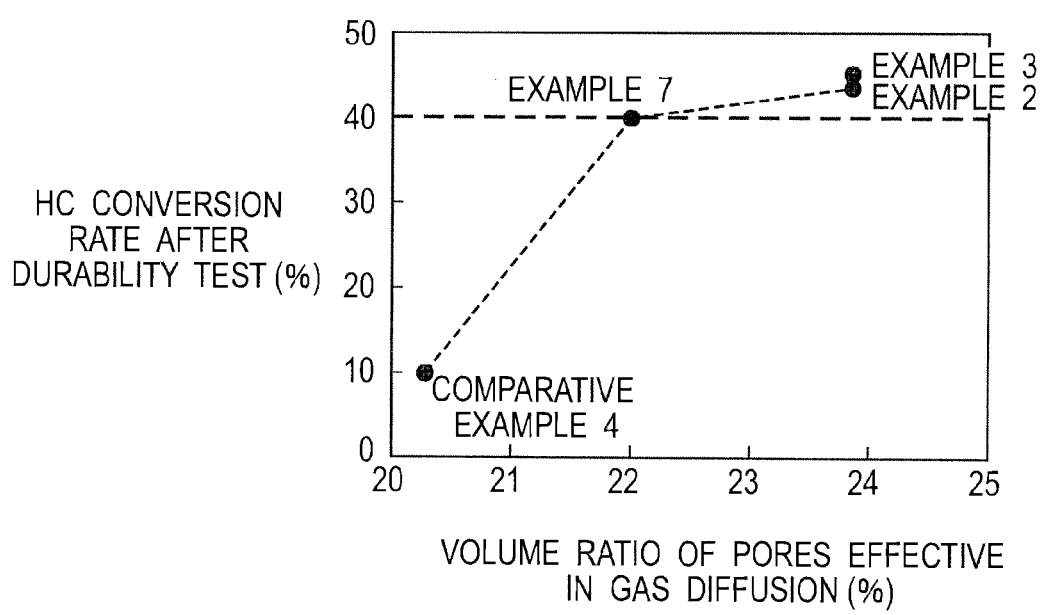
FIG. 8 is a graph showing a relationship between each volume ratio of the pores effective in the gas diffusion in the noble metal-supported powder and each HC conversion rate of an exhaust gas purifying catalyst after being subjected to a durability test.

FIG. 8 is a graph showing a relationship between each volume ratio of the pores effective in the gas diffusion in the noble metal-supported powder and each HC conversion rate of the exhaust gas purifying catalyst after being subjected to the durability test. As apparent from FIG. 8, in the noble metal-supported powder, the purification performance is higher as the volume ratio of the pores effective in the gas diffusion is larger. The volume ratio of the pores effective in the gas diffusion, which is necessary to obtain 40% as the HC conversion rate after the durability test, is 22% or more. Here, 40% as the HC conversion rate is the target in the present invention. Hence, when consideration is made in combination with the relationship between each drying time and each volume ratio of the pores, which is shown in FIG. 7, it is understood that, in order to obtain the HC conversion rate after the durability test, which is the target in the present invention, it is necessary to rapidly dry the slurry within 1 second.

Moreover, in accordance with comparison between Example 2 and Example 3 in FIG. 8, the purification performance was able to be further enhanced in such a manner that the Ce-containing oxide powder particles are contained in the noble metal-supported powder.

Figure 9:
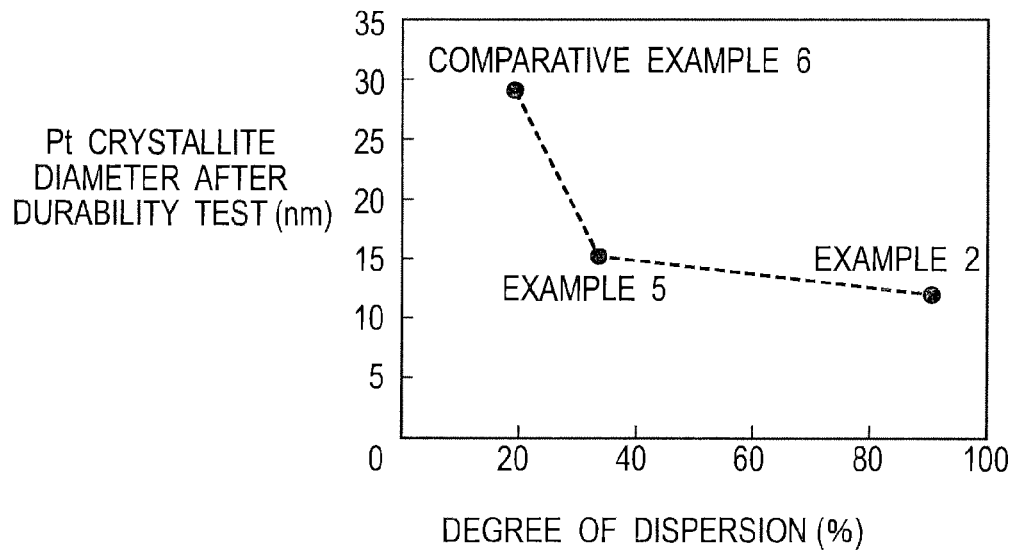
FIG. 9 is a graph showing a relationship between degree of dispersion of the slurry and each Pt crystallite diameter of the exhaust gas purifying catalyst after being subjected to the durability test.

FIG. 9 is a graph showing a relationship between the degree of dispersion of the slurry and each Pt crystallite diameter of the exhaust gas purifying catalyst after being subjected to the durability test. As apparent from FIG. 9, the Pt crystallite diameter after the durability test is smaller as the degree of dispersion of the noble metal-supported powder particles is higher. This represents that the movement and aggregation/particle growth of the noble metal occurs less often after the durability test since the noble metal-supported powder particles are fixed in the state of being spaced apart from one another by the high dispersion treatment immediately before the quick drying. Moreover, in accordance with comparison between Example 5 and Comparative example 6, in Example 5, the Pt crystallite diameter after the durability test was able to be remarkably reduced than that of Comparative example 6 in such a manner that the degree of dispersion was set at 33% or more.

Figure 10:
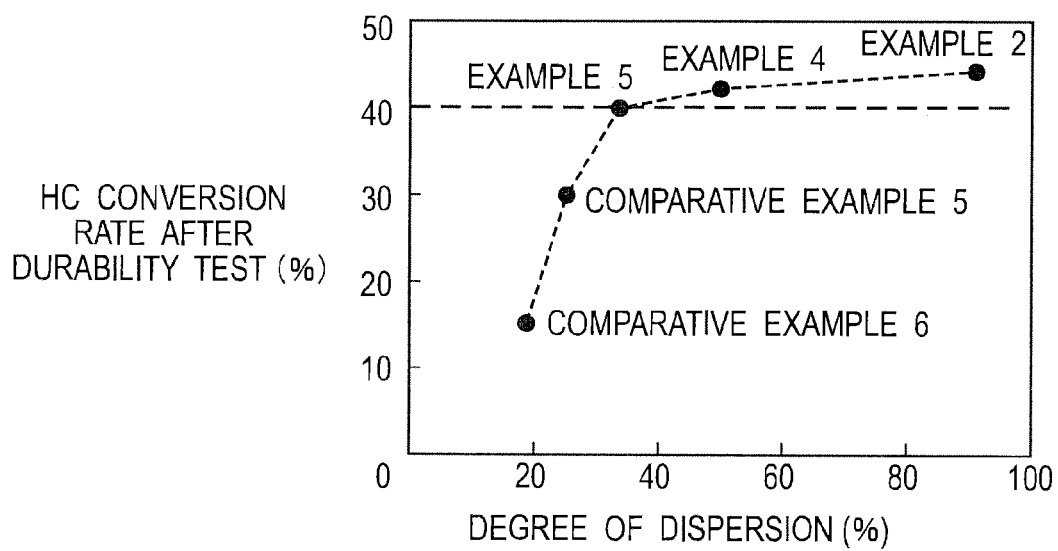
FIG. 10 is a graph showing a relationship between the degree of dispersion of the slurry and each HC conversion rate of the exhaust gas purifying catalyst after being subjected to the durability test.

FIG. 10 is a graph showing a relationship between the degree of dispersion of the slurry and each HC conversion rate of the exhaust gas purifying catalyst after being subjected to the durability test. As apparent from FIG. 10, the degree of dispersion of the noble metal-supported powder particles, which is necessary to obtain 40% as the HC conversion rate after the durability test, is 33% or more. Here, 40% as the HC conversion rate is the target in the present invention. Then, in each of Examples 5 and 4 and Example 2, the HC conversion rate of the exhaust gas purifying catalyst after the durability test was as excellent as 40% or more.

Figure 11:
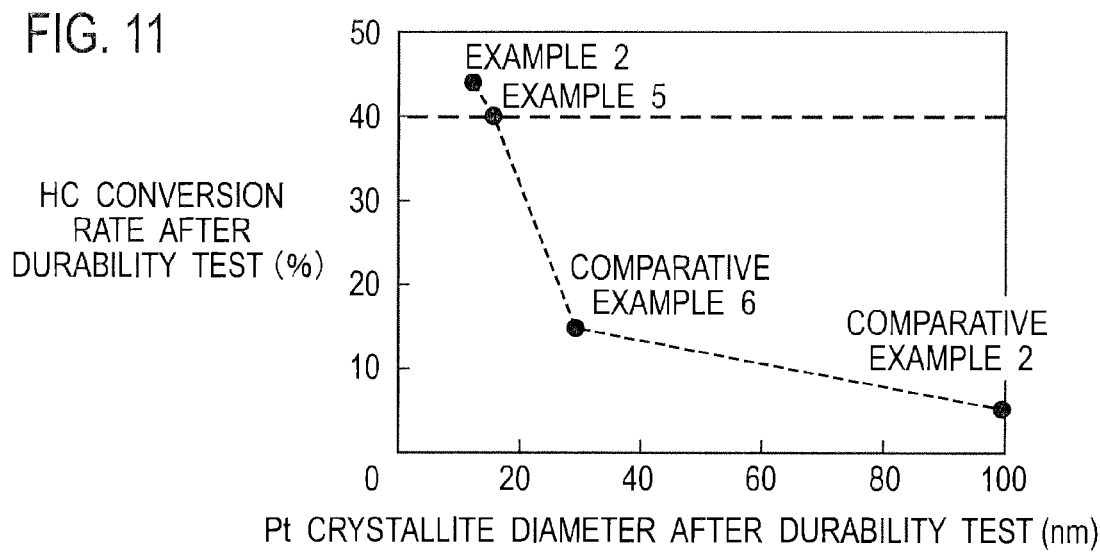
FIG. 11 is a graph showing a relationship between each Pt crystallite diameter of the exhaust gas purifying catalyst after being subjected to the durability test and each HC conversion rate of the exhaust gas purifying catalyst after the durability test.

FIG. 11 is a graph showing a relationship between each Pt crystallite diameter of the exhaust gas purifying catalyst after being subjected to the durability test and each HC conversion rate of the exhaust gas purifying catalyst after the durability test. As apparent from FIG. 11, it is seen that the Pt crystallite diameter after the durability test, which is necessary to obtain 40% as the HC conversion rate that is the target in the present invention, is 15 [nm] or less.

Figure 12:
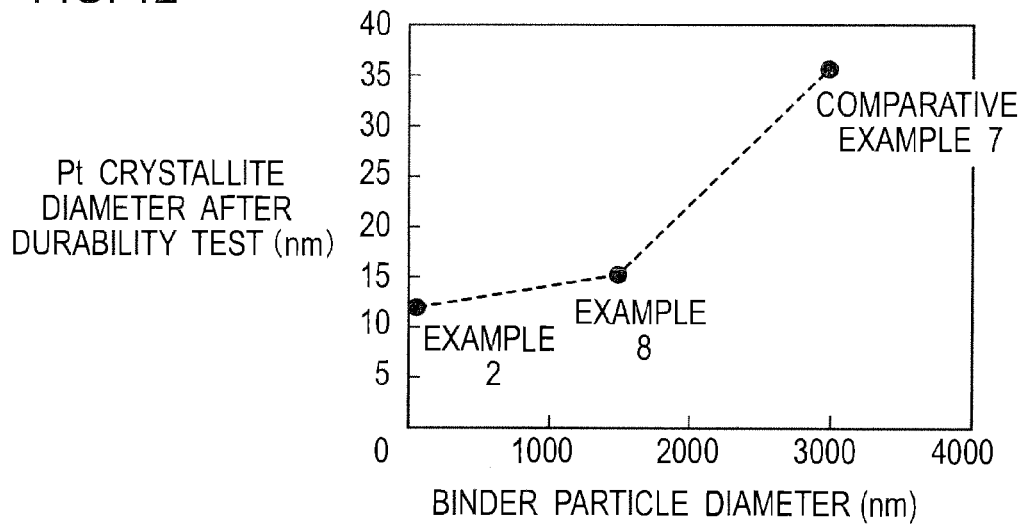
FIG. 12 is a graph showing a relationship between each particle diameter of a binder mixed with the noble metal-supported powder particles and each Pt crystallite diameter after the exhaust gas purifying catalyst is subjected to the durability test.

FIG. 12 is a graph showing a relationship between each particle diameter of the binder mixed with the noble metal-supported powder particles and each Pt crystallite diameter after the exhaust gas purifying catalyst is subjected to the durability test.

As mentioned above, the Pt crystallite diameter after the durability test, which is necessary to obtain 40% as the HC conversion rate that is the target in the present invention, is 15 [nm] or less. Meanwhile, from FIG. 12, it is seen that the binder particle diameter that allows the Pt crystallite diameter after the durability test to be set at 15 [nm] or less is 1500 [nm] or less. Specifically, it is seen that, desirably, the binder particle diameter is set at 10 times or less that of the noble metal-supported powder particles.

Figure 13:
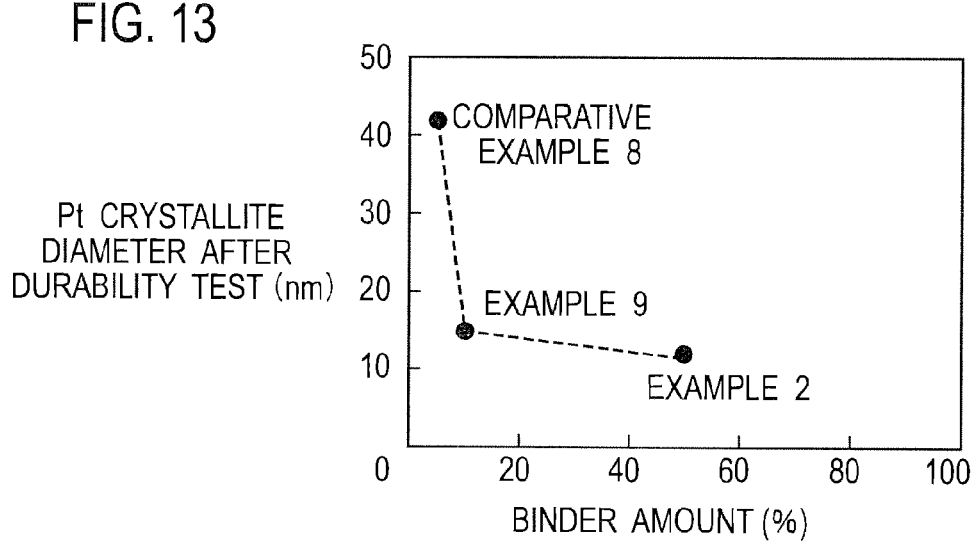
FIG. 13 is a graph showing a relationship each binder amount of the slurry and each Pt crystallite diameter after the durability test.

FIG. 13 is a graph showing a relationship each binder amount of the slurry and each Pt crystallite diameter after the durability test. As mentioned above, the Pt crystallite diameter after the durability test, which is necessary to obtain 40% as the HC conversion rate that is the target in the present invention, is 15 [nm] or less. Meanwhile, referring to FIG. 13, the binder amount that allows the Pt crystallite diameter after the durability test to be set at 15 [nm] or less is 10% or more. Specifically, it is seen that, desirably, the mixing ratio of the noble metal-supported powder particles and the binder be set so that the mixing ratio of the noble metal-supported powder particles can become 90% or less.

Figure 14:
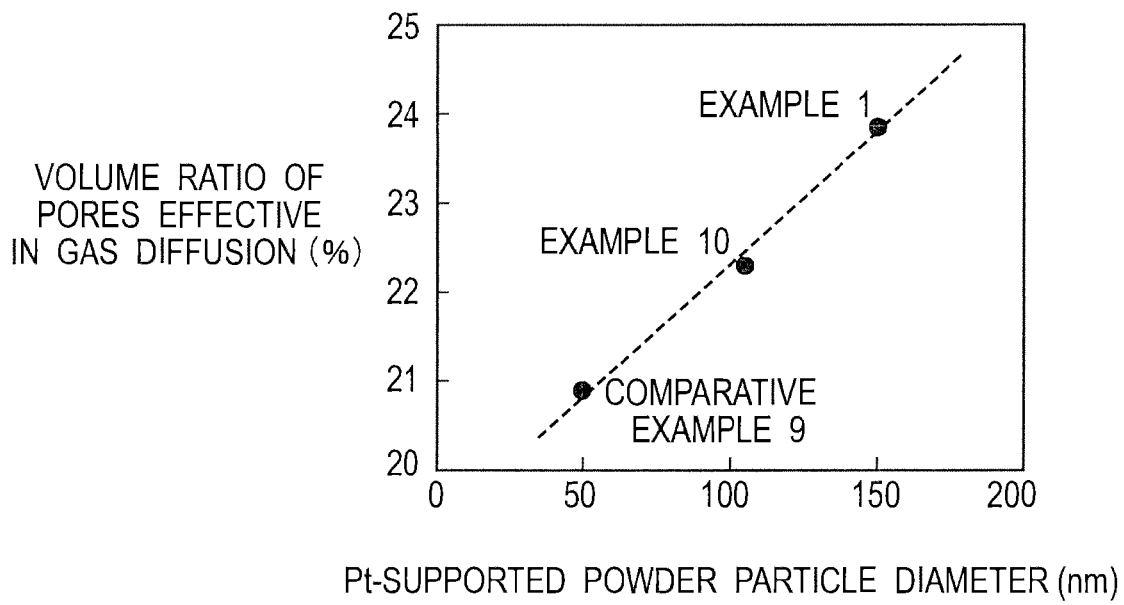
FIG. 14 is a graph obtained by comparison among Example 1, Example 10 and Comparative example 9, showing a relationship between each particle diameter of Pt-supported powder particles and each volume ratio of the pores effective in the gas diffusion.

FIG. 14 is a graph obtained by comparison among Example 1, Example 10 and Comparative example 9, showing a relationship between each particle diameter of the Pt-supported powder particles and each volume ratio of the pores effective in the gas diffusion. As seen from FIG. 14, the noble metal-supported powder particle diameter, which allows the volume ratio of the pores effective in the gas diffusion to become 22% or more that is necessary to obtain 40% as the target HC conversion rate after the durability test, is 90 [nm] or more.

Figure 15:
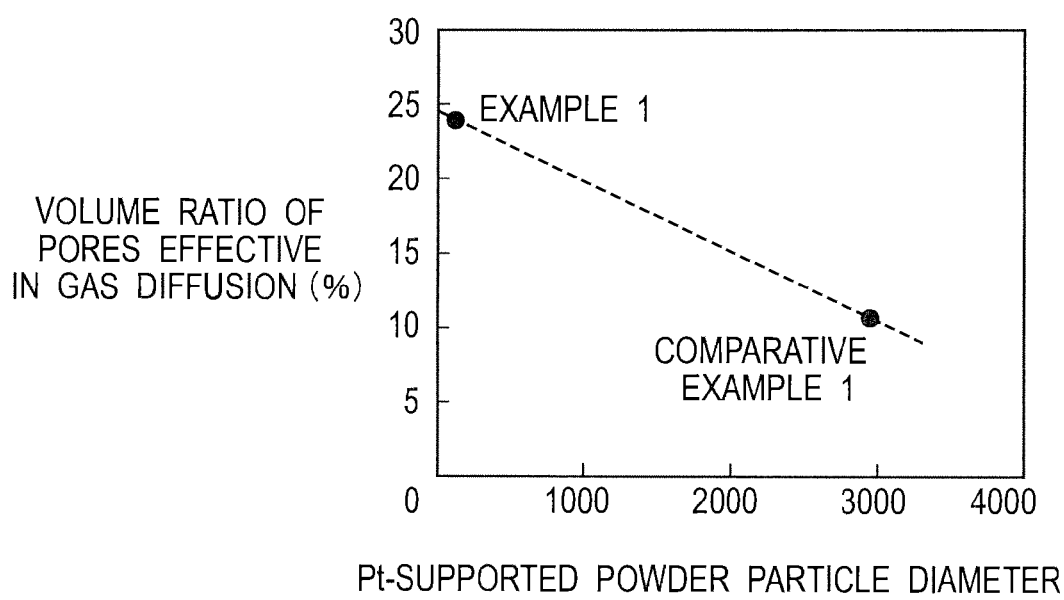
FIG. 15 is a graph obtained by comparison between Example 1 and Comparative example 1, showing a relationship between each particle diameter of the Pt-supported powder particles and each volume ratio of the pores effective in the gas diffusion.

FIG. 15 is a graph obtained by comparison between Example 1 and Comparative example 1, showing a relationship between each particle diameter of the Pt-supported powder particles and each volume ratio of the pores effective in the gas diffusion. As seen from FIG. 15, the noble metal-supported powder particle diameter, which allows the volume ratio of the pores effective in the gas diffusion to become 22% or more that is necessary to obtain 40% as the target HC conversion rate after the durability test, is 550 [nm] or more.

Moreover, also referring to FIG. 8 and FIG. 10, which are mentioned above, the volume of the pores effective in the gas diffusion is sufficiently ensured, and the noble metal-supported powder particles are fixed in the state of being spaced apart from one another, whereby the noble metal in the inside of the powder can also be used effectively to purify the exhaust gas, and accordingly, an exhaust gas purifying catalyst having the target HC conversion rate after the durability test was obtained.

The entire contents of Japanese Patent Application No. 2007-290743 (filed on: Nov. 8, 2007) and Japanese Patent Application No. 2008-283480 (filed on: Nov. 4, 2008) are incorporated herein by reference.

The description has been made above of the embodiment to which the invention made by the inventors is applied; however, the present invention is not limited by the description and the drawings, which form a part of the disclosure of the present invention by the embodiment. It is additionally mentioned here that, specifically, other embodiments, examples, operation technologies and the like, which are made by those skilled in the art and the like based on the above-mentioned embodiment, are entirely incorporated in the scope of the present invention.

The invention claimed is:

1. A method of producing noble metal-supported powder, comprising:
    preparing a mixed slurry by mixing noble metal-supported powder particles and a binder with each other in a liquid; and
    dispersing the noble metal-supported powder particles by applying vibrations to the mixed slurry, and thereafter, spray drying the mixed slurry while keeping a state where the noble metal-supported powder particles are dispersed,
    wherein degree of dispersion of the noble metal-supported powder particles in the slurry is set at 33% or more by applying the vibrations to the slurry.

2. A method of producing noble metal-supported powder, comprising:
    preparing a mixed slurry by mixing noble metal-supported powder particles and a binder with each other in a liquid; and
    dispersing the noble metal-supported powder particles by applying vibrations to the mixed slurry, and thereafter, spray drying the mixed slurry while keeping a state where the noble metal-supported powder particles are dispersed,
    wherein, as the binder, one containing inorganic oxide as a main component, in which a mean particle diameter is within a range from $1/10$ to 10 times a mean particle diameter of the noble metal-supported powder particles, is used, and
    a mixing ratio of the noble metal-supported powder particles and the binder is set within a range from 10:90 to 90:10.

3. A method of producing noble metal-supported powder, comprising:
    preparing a mixed slurry by mixing noble metal-supported powder particles and a binder with each other in a liquid; and
    dispersing the noble metal-supported powder particles by applying vibrations to the mixed slurry, and thereafter, spray drying the mixed slurry while keeping a state where the noble metal-supported powder particles are dispersed,
    wherein Ce-containing oxide powder particles are added to and mixed with the mixed slurry before the vibrations are added thereto.

4. A method of producing noble metal-supported powder, comprising:
    preparing a mixed slurry by mixing noble metal-supported powder particles and a binder with each other in a liquid; and
    dispersing the noble metal-supported powder particles by applying vibrations to the mixed slurry, and thereafter, spray drying the mixed slurry while keeping a state where the noble metal-supported powder particles are dispersed,
    wherein the spray drying is performed under a condition where moisture of liquid droplets of the mixed slurry with a diameter of 1 mm or less is evaporated with 1 second per piece of the liquid droplets.

* * * * *